United States Patent [19]

Wichmann

[11] Patent Number: 5,678,303
[45] Date of Patent: Oct. 21, 1997

[54] APPARATUS FOR SEPARATING FILM FROM X-RAY CASSETTES

[75] Inventor: Mark William Wichmann, Wilmington, Del.

[73] Assignee: Sterling Diagnostic Imaging, Inc., Glasgow, Del.

[21] Appl. No.: 109,211

[22] Filed: May 24, 1993

Related U.S. Application Data

[63] Continuation of Ser. No. 892,469, Jun. 2, 1992, abandoned.

[51] Int. Cl.⁶ ............................................. G30D 13/00
[52] U.S. Cl. .................... 29/806; 378/182; 378/188
[58] Field of Search ........................ 271/18; 29/426.3, 29/426.4, 806; 156/584; 378/182, 188

[56] References Cited

U.S. PATENT DOCUMENTS

| | | | |
|---|---|---|---|
| 2,878,389 | 3/1959 | Raffman | 250/68 |
| 3,135,864 | 6/1964 | Sano | 250/68 |
| 3,511,990 | 5/1970 | Hauss | 250/68 |
| 3,836,783 | 9/1974 | Stievenart et al. | 250/481 |
| 4,334,945 | 6/1982 | Raush | 156/344 |
| 4,352,198 | 9/1982 | Fukushima et al. | 378/185 |
| 4,383,330 | 5/1983 | DeFelice et al. | 378/187 |
| 4,386,431 | 5/1983 | Van Landeghem et al. | 378/187 |
| 4,434,501 | 2/1984 | Pfeiffer | 378/187 |
| 4,444,484 | 4/1984 | Best et al. | 354/276 |
| 4,530,444 | 7/1985 | Christian | 271/18 X |
| 4,613,984 | 9/1986 | Fisher et al. | 378/185 |
| 4,630,297 | 12/1986 | Lerma | 378/185 |
| 4,688,243 | 8/1987 | De Felice et al. | 378/187 |
| 4,692,083 | 9/1987 | LeRoux et al. | 414/411 |
| 4,712,228 | 12/1987 | Johnson et al. | 378/185 |
| 4,734,926 | 3/1988 | Singer et al. | 378/187 |
| 4,823,535 | 4/1989 | Schmidt et al. | 53/266 R |
| 4,870,285 | 9/1989 | Ohgoda | 250/484.1 |
| 4,887,284 | 12/1989 | Bauer et al. | 378/173 |
| 4,889,989 | 12/1989 | Yoshimura et al. | 250/327.2 |

FOREIGN PATENT DOCUMENTS

| | | | |
|---|---|---|---|
| 30 002 504 | 1/1980 | Germany . | |
| 3002504 A1 | 8/1980 | Germany | G03B 41/18 |
| 37 06 046 | 2/1987 | Germany . | |
| 3706046 C1 | 5/1988 | Germany | G03D 13/00 |

OTHER PUBLICATIONS

Research Disclosure 22603, Research Disclosure, Feb. 1983, p. 62, Radiographic Cassette Comprising Lifting Means For Film.

*Primary Examiner*—Joseph M. Gorski

[57] ABSTRACT

The present invention relates to apparatus for separating sheets from substrates without substantially moving the sheets and, specifically where the sheets are sheets of X-ray film and the substrates are screens found in conventional X-ray cassettes.

16 Claims, 14 Drawing Sheets

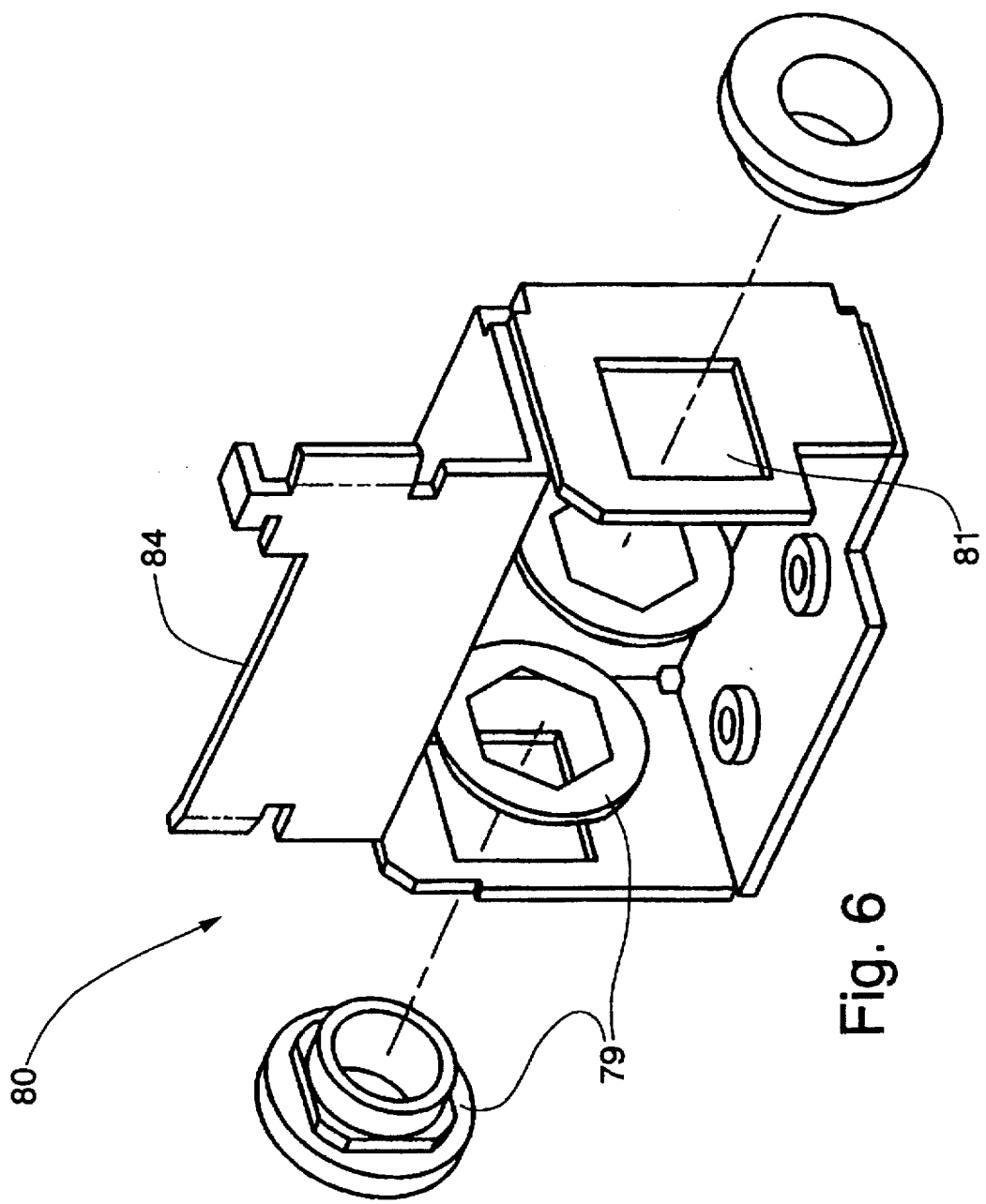

APPARATUS FOR SEPARATING FILM FROM X-RAY CASSETTES

This is a continuation of application Ser. No. 07/892,469 filed Jun. 2, 1992, and now abandoned.

BACKGROUND OF THE INVENTION

1. Field of the Invention

This invention relates to apparatus for separating sheets from substrates, specifically, where the sheets are sheets of X-ray film and the substrates are screens found in X-ray cassettes.

2. Description of Related Art

Until the advent of automatic film handling systems, film sheets and in particular X-ray film sheets were handled manually by loading the film sheet into a cassette in the dark, exposing it under daylight conditions and then taking the cassette into a darkroom, opening it and placing the film sheet into a processor all in the dark. Various systems are available for the handling of photographic film sheets and in particular X-ray film sheets (or radiographs) in daylight conditions. One such automatic X-ray film handling system is disclosed in U.S. Pat. No. 4,514,958.

One such system for automatic daylight handling of film in a cassette is an apparatus for receiving an exposed X-ray film sheet stored within a cassette between a pair of intensifying screens. The system automatically opens the cassette, removes the exposed film sheet, places an unexposed sheet into the cassette, closes the cassette and ejects the reloaded cassette to an operator; during which time the exposed film sheet is transported to a film processor for development. However, efforts to increase the productivity of the film handling apparatus or system to quickly load and unload cassettes are limited by the attraction of a film sheet to one of the intensifying screens in the cassette during the unload operation. At times the film is so attracted to one of the intensifying screens, that when the cassette is opened the film does not remain on the bottom screen, but rather is lifted with the intensifying screen on the door of the cassette as it opens. In prior systems, the attraction of the film to the top or cover screen prevents the timely and controlled removal of the sheet from the cassette. Further, X-ray cassettes are specifically designed to squeeze out air from between the film and the intensifying screens in the cassette in order to enhance radiograph quality. This lack of air between the film and the screens hinders or precludes the easy separation of the film and screens. The attraction of the sheets to the screens, mainly due to electrostatic and vacuum forces, prevents the separation of a film from the intensifying screens in a reliable fashion.

SUMMARY OF THE INVENTION

There is a need for an apparatus associated with an cassette opening-closing assembly in an automatic film handling device which facilitates the timely separation of a film from a surface of a cassette upon opening of the cassette. In accordance with this invention, there is provided an apparatus for separating a sheet from a surface in an X-ray cassette with a top portion and a bottom portion in an automatic X-ray cassette handling assembly, the apparatus comprising:

a peeling element for insertion between the sheet and the surface and for peeling the sheet from the surface; and first means for inserting the peeling element between the sheet and the surface and for moving the peeling element with respect to the surface separating the sheet from the surface.

BRIEF DESCRIPTION OF DRAWINGS

The invention can be more fully understood from the following detailed description thereof in connection with accompanying drawings described as follows.

FIG. 6 is an exploded view of a carrier of the sheet separation apparatus.

DESCRIPTION OF THE PREFERRED EMBODIMENT(S)

Figure 1:
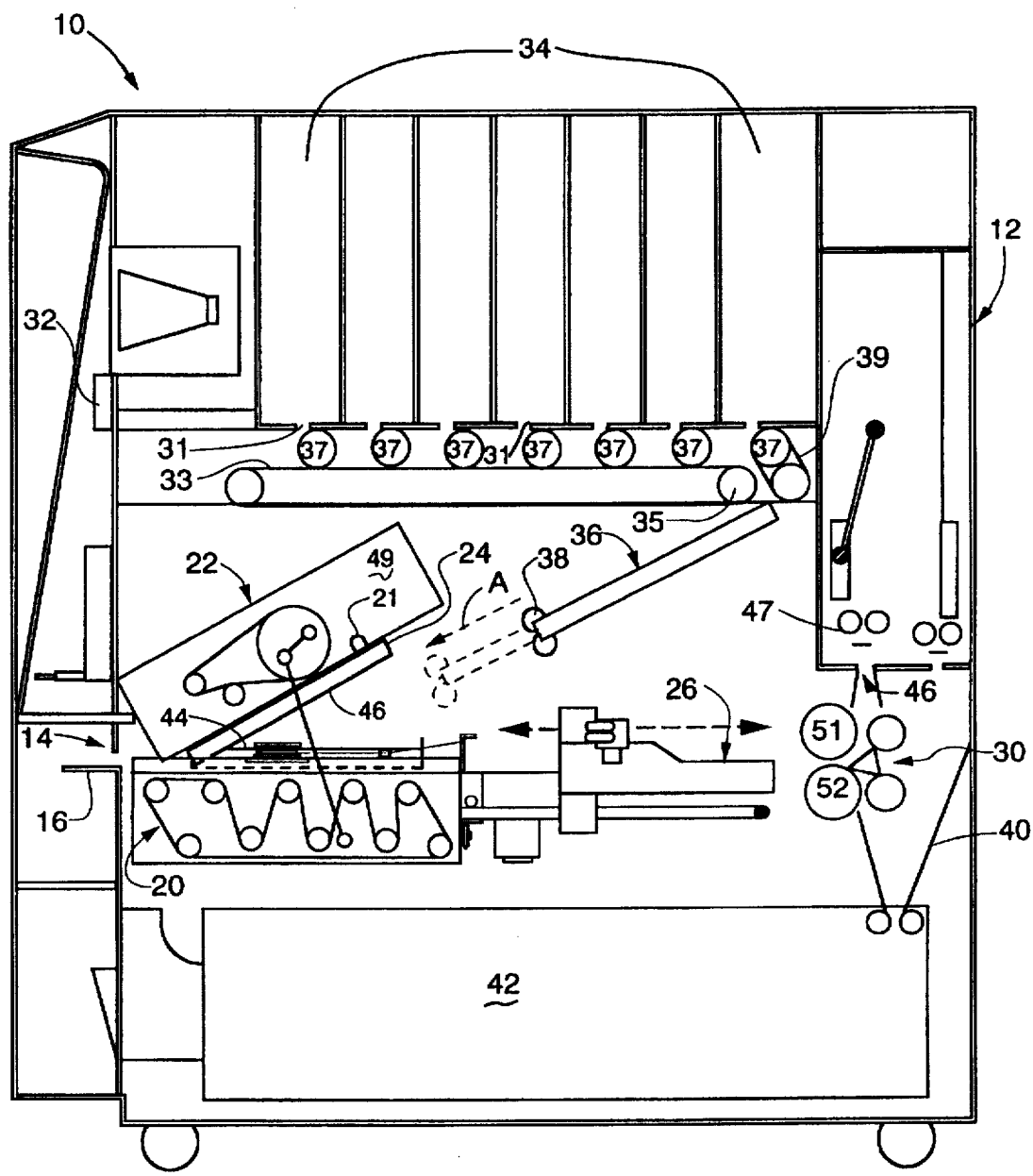
FIG. 1 is a simplified schematic cross-sectional view of an automatic film handling apparatus including a schematic representation of a cassette opening and closing assembly with sheet separation apparatus in accordance with this invention.

Throughout the following detailed description, similar reference characters refer to similar elements in all figures of the drawings.

Referring to FIG. 1, an automatic daylight film handling apparatus 10 is shown with a film separation apparatus 25 in accordance with this invention schematically depicted in association with a cassette opening-closing assembly 22.

The operation of the automatic film handling apparatus 10 begins by an operator inserting a closed cassette 24 having an exposed film into a slot 14 at a feed tray 16 in a substantially light tight housing of the film handling apparatus 10. The slot 14 has a light gate (not shown) which opens and closes to allow the cassette 24 into the apparatus 10 and yet prevents light into the interior of the apparatus 10. A plurality of rollers 20 transport the cassette 24 from the entrance slot 14 into the cassette opening-closing assembly 22. During transport of the cassette 24 into the opening-closing assembly 22, the cassette 24 is aligned to a front corner of the opening-closing assembly 22. The opening-closing assembly 22 opens the cassette 24 by disengaging latches on the cassette 24 and lifting with vacuum elements 21 a top door of the cassette 24 while the film separation apparatus 25 operates to assure separation of the film from intensifying screens in the cassette 24. Exposed film in the opened cassette 24 is removed from a front or bottom intensifying screen of the cassette 24 by a vacuum-operated lifting and transporting assembly 26 which lifts and transports the exposed film to a first pair of nip rollers 51, 52 of a film diverter assembly 30. For example, the vacuum-operated lifting assembly 26 can be as disclosed in U.S. Pat. No. 5,083,764.

The automatic daylight film handling apparatus 10 includes film reloading apparatus for reloading the cassette 24 with non-exposed film. The operator may input at a console 32 associated with the film handling apparatus 10 the type of film desired for the re-loading of the cassette 24. Alternately, referring to FIG. 2, a microprocessor assembly or microprocessor 15 associated with the apparatus 10 can determine the type of film needed from a sensor assembly 19 reading a label on the cassette 24. The film handling apparatus 10 has a host computer (not shown) which communicates with one or more subsystem microprocessors, one of which is the microprocessor 15, shown in FIG. 2.

Referring back to FIG. 1, an appropriate fresh, i.e., non-exposed, film is dispensed from one of a plurality of film storage magazines 34 through a dispensing slot 31 onto a first endless belt 33 which is driven by a roller 35. For a detailed description of a suitable film storage magazine 34 that can be used as stated herein, see U.S. Pat. No. 4,482, 146. The first belt 33 is moving clockwise in FIG. 1 when a fresh film is dispensed so that a leading edge of the fresh film is directed to a nip formed between a top surface or run of the first belt 33 and a roller 37 substantially below the film storage magazine 34 and beside the dispensing slot 31. Since each roller 37 associated with a film storage magazine 34 forms a nip between itself and the top run of the first belt 33, the fresh film is transported on the first belt 33 to a nip formed between the first belt 33 and a second endless belt 39. The second belt 39 is driven by frictional contact with the first belt 33 and is moving counter-clockwise in FIG. 1. When the leading edge of the film contacts the second belt 39, the film is directed into the nip between the first belt 33 and second belt 39 which transports the film to a chute 36. Each of the first endless belt 33 and the second endless belt 39 can include one or more belts.

The fresh film travels down the chute 36 to a pair of nip rollers 38 which hold the fresh film and extend in the direction of arrow A in FIG. 1 to place the fresh film into the opened cassette 24. The opening-closing assembly 22 closes the cassette 24 and secures the latches on the cassette 24.

The plurality of rollers 20 transport the cassette 24 from the opening-closing assembly 22 and eject the cassette 24 onto the feed tray 16.

Meanwhile, the vacuum-operated lifting assembly 26 transports the film removed from the cassette 24 toward the first pair of nip rollers 51,52 of the film diverter assembly 30. Movement of the vacuum-operated lifting assembly 26 toward the film diverter assembly 30 provides information to the host computer concerning the presence of the exposed film. The host computer also receives information on the presence of a film in a feed chute 40 of a processor 42 associated with film handling apparatus 10. The host computer determines whether the film can be transported directly into the processor 42 or transported into an intermediate film storage apparatus 12 for dispensing at a later time, and directs the movement of the film diverter assembly 30 to thereby guide the exposed film to the appropriate path accordingly. For a detailed description of a suitable diverter assembly 30 that can be used, see U.S. patent application Ser. No. 07/796,520. For a detailed description of a suitable film storage apparatus 12 that can be used, see U.S. patent application Ser. No. 07/797,486.

The reliability and performance of the daylight film handling apparatus 10 can be hindered by the film adhering to one of the surfaces or intensifying screens in the cassette 24 due mainly to electrostatic and vacuum forces. In the daylight film handling apparatus 10, the cassette 24 will have one portion which remains horizontal during the opening-closing sequence and this portion will be referred to as the cassette bottom or front portion 44. See FIG. 3. The portion of the cassette 24 which is raised and lowered by the cassette opening-closing assembly 22 will be referred to as the cassette top or cover portion 46. Similarly, the surface or intensifying screen located on the cassette front 44 will be referred to as the front surface or front intensifying screen 47. The surface or intensifying screen located on the cassette cover 46 will be referred to as the cover surface or cover screen 48. See FIG. 5. If a film adheres to the front screen 47 of the cassette 24 when opened by the opening-closing assembly 22, the vacuum-operated lifting assembly 26 illustrated in FIG. 1 can be designed, such as disclosed in U.S. Pat. No. 5,083,764, to overcome the electrostatic and/or vacuum forces in order to lift and transport the film from the cassette 24. If, when the cassette 24 is opened, a film adheres to the cover screen 48 of the cassette 24, the vacuum-operated lifting assembly 26 disclosed in U.S. Pat. No. 5,083,764 cannot contact the film to lift and transport the film from the cassette 24. The film separation apparatus 25 of this invention assures that a film separates from the cover screen 48, so that the vacuum-operated lifting assembly 26 can then lift the film from off the front screen 47 and transport the film along its intended path.

Figure 2:
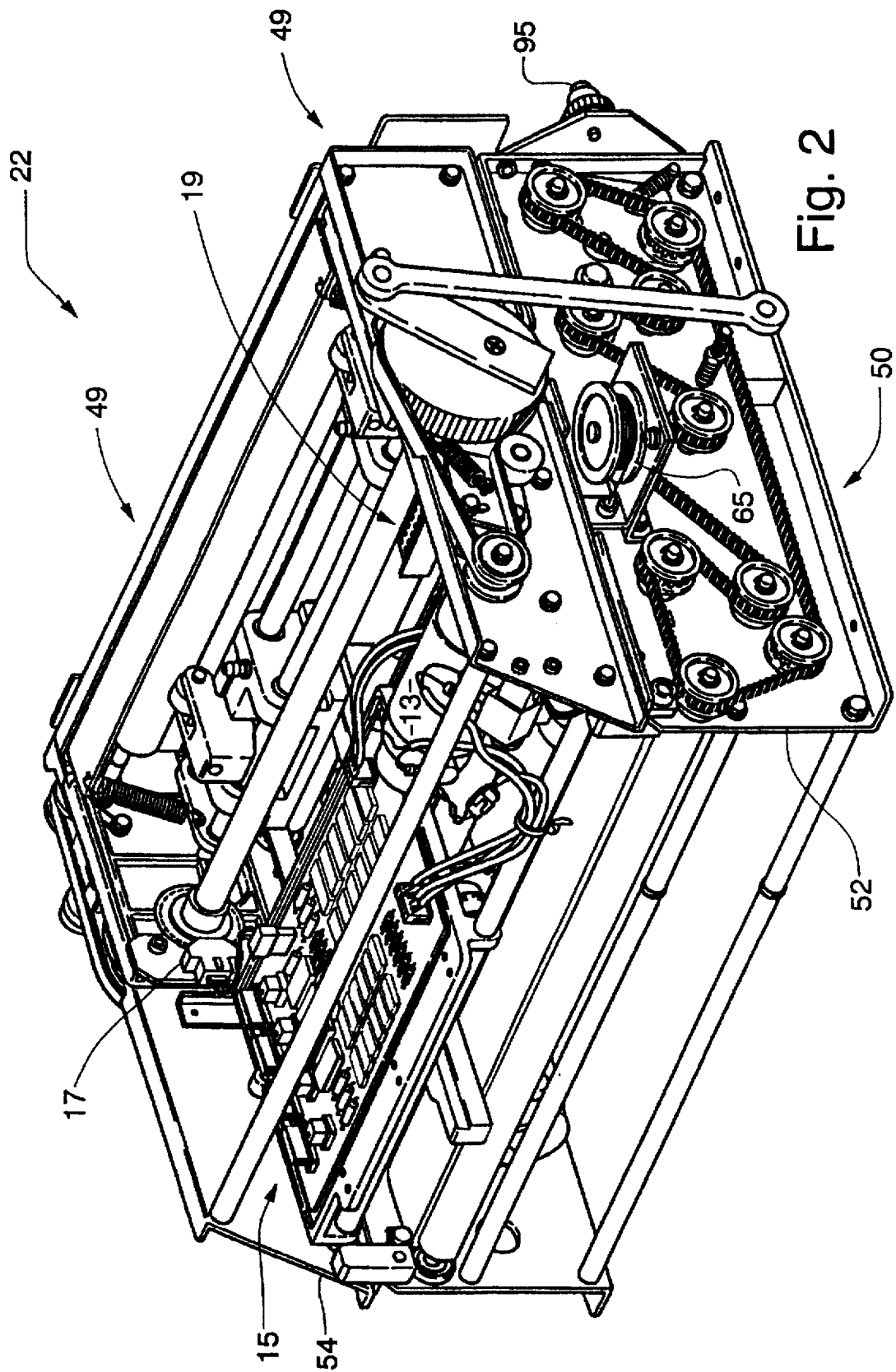
FIG. 2 is a perspective view of a cassette opening and closing assembly.
Figure 3:
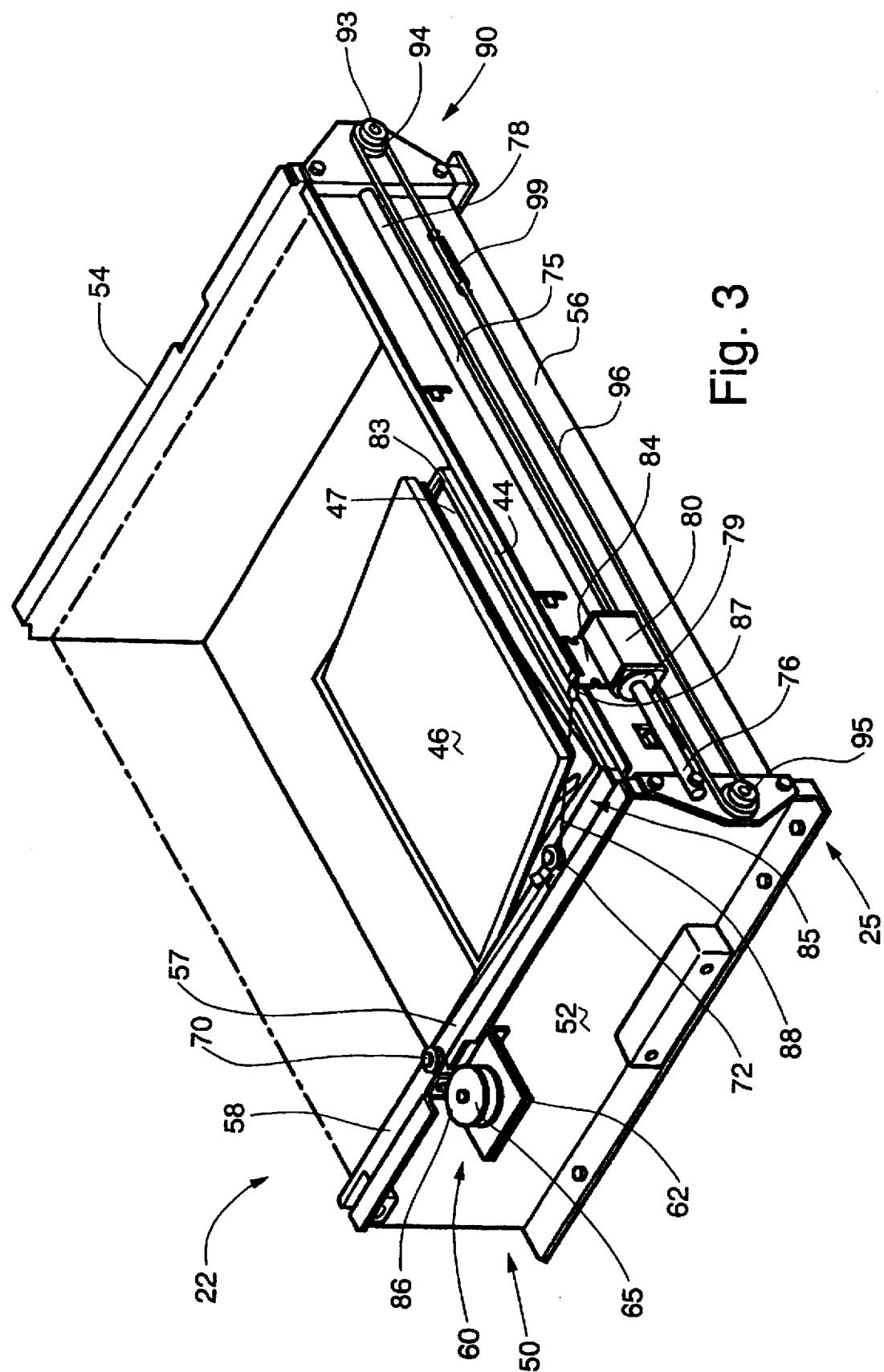
FIG. 3 is a perspective view of the cassette opening and closing assembly with an upper portion removed showing one embodiment of the sheet separation apparatus in accordance with this invention.
Figure 4:
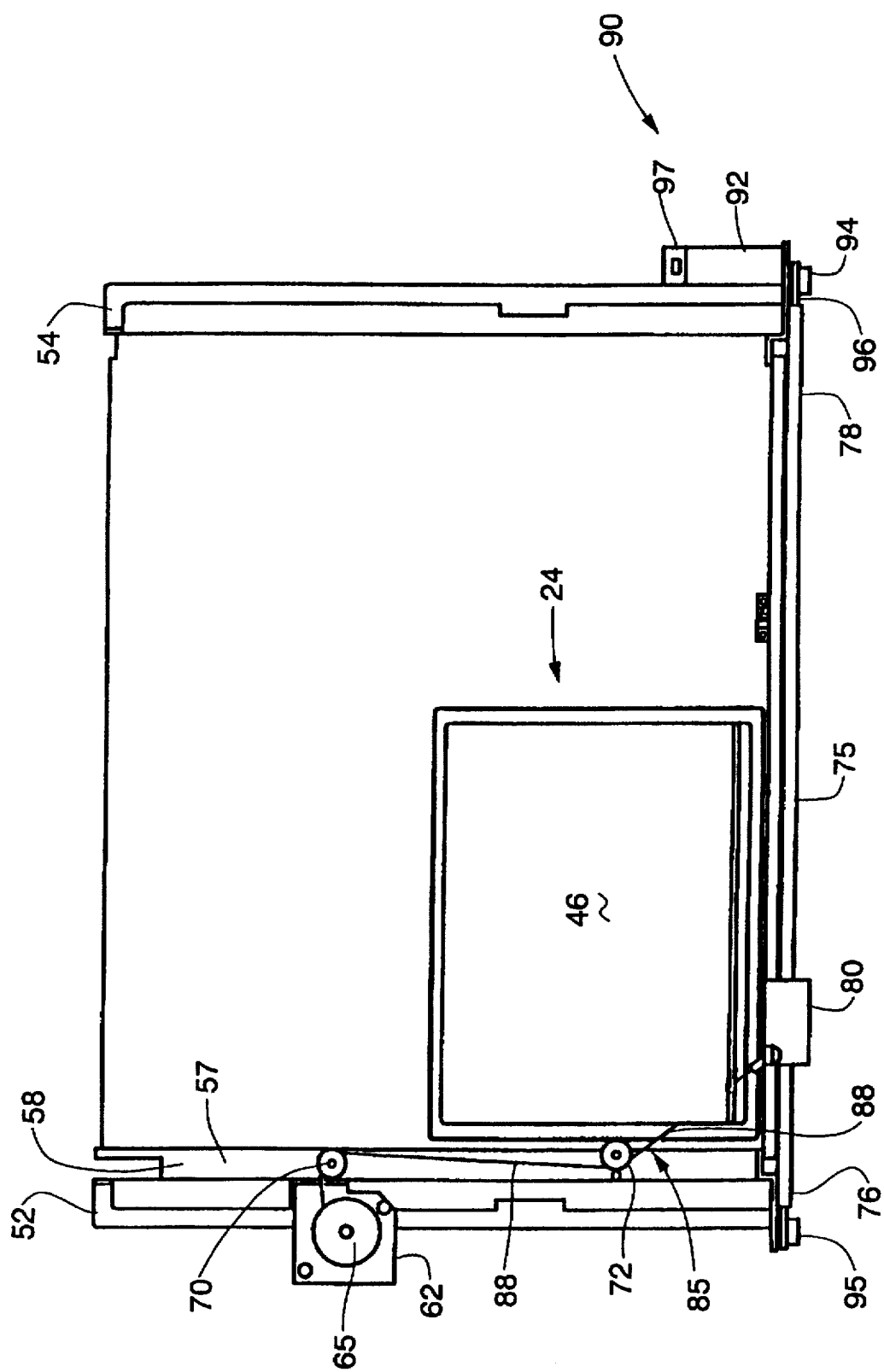
FIG. 4 is a top view of the cassette opening and closing assembly with the upper portion removed, showing one embodiment of a peeling element of the sheet separation apparatus in place in a partially opened cassette which has a film attracted to an intensifying screen on a door of the cassette.
Figure 5:
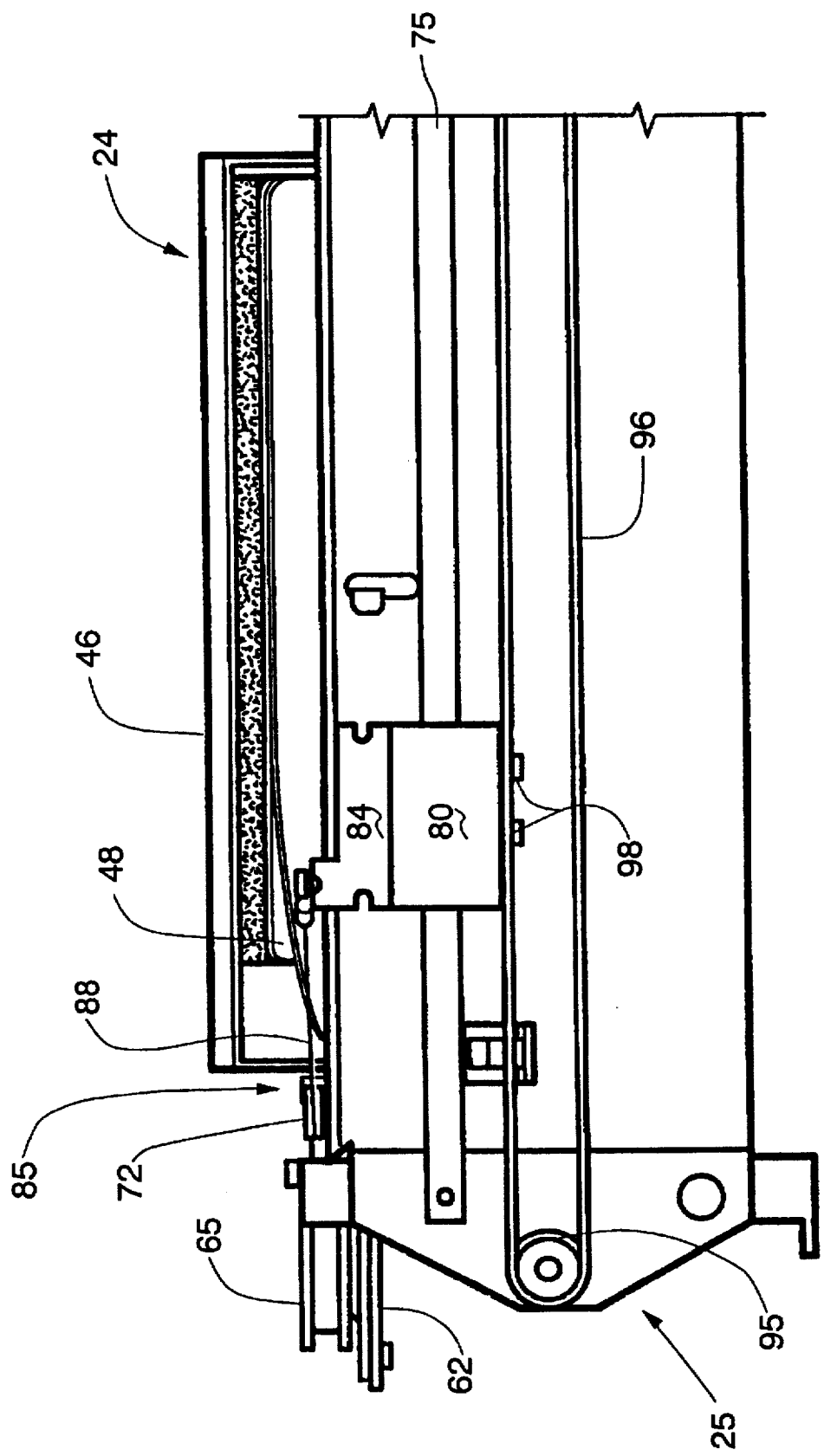
FIG. 5 is an exploded front view of the sheet separation apparatus with a cassette having a window cutout area.

Referring to FIGS. 3, 4 and 5, the film separation apparatus 25 is shown with the cassette opening-closing assembly 22 which has an upper portion 49, i.e., a cassette door opening-closing mechanism, which is shown in FIG. 2, removed. The cassette opening-closing assembly 22 has a subframe 50 mountable to a frame of the daylight film handling apparatus 10. The subframe 50 has a first side 52, a second side 54 and a third side 56. A spacer member 57 is located adjacent to the first side 52 of the subframe 50 to appropriately position the cassette 24 in the opening-closing assembly 22. A front corner of the cassette 24 is located in a corner of the spacer member 57 and the third side 56 of the subframe 50, hereinafter referred to as the front corner of the subframe 50 (as illustrated in FIG. 3). The cassette 24 is partially opened by the opening-closing assembly 22 to depict the initial position of a peeling element 85 in relation to the front corner of the cassette 24 in the front corner of the subframe 50 and in relation to the film and surfaces of the screens 47,48. A first guide 70 and a second guide 72 are mounted to a top surface 58 of the spacer member 57. A shaft 75 is mounted parallel or substantially parallel to the third side 56 of the subframe 50 extending between the first side 52 and the second side 54. The shaft 75 has a first end 76 and a second end 78.

As shown in FIG. 6, a carrier 80 has a passage 81 and bearings 79 mounted to slideably engage the shaft 75. The bearings 79 are mounted to the carrier 80 for noise and wear considerations. The carrier 80 has an integral member 84 which extends vertically and slightly above a highest surface near or at the front corner of the horizontal portion 44 of the opened cassette 24 in the opening-closing assembly 22. The highest surface of the horizontal front portion 44 of the opened cassette 24 is typically a lip edge 83 on the cassette 24.

A reel assembly 60 is mounted on a bracket 62 to the first side 52 of the subframe 50. The reel assembly 60 comprises a reel 65 with a torsional spring (not shown). Peeling elements suitable for use in this invention are elements which can be interspersed in a localized area above a cantilevered film portion in the partially opened cassette 24. One embodiment of the peeling element 85 is shaped as a cable 88 having a first end 86 and a second end 87. The peeling element 85 may also be made of a monofilament which operates similar to the peeling element 85 when it is shaped as a cable. However, the peeling element 85 is preferably a nylon-coated stainless steel cable. A preferred reel assembly 60 and peeling element 85 are reel assembly Model 4575-4 which is sold as a single unit from Ametek, Hunter Spring Division, Hatfield, Pa. The first end 86 of the cable 88 is secured to the reel 65 of the reel assembly 60 and a portion of the cable 88 is wrapped on the reel 65 of the reel assembly 60. The cable 88 is directed by the first guide 70 and second guide 72 positioning the cable 88 at or near the front corner of the opened cassette 24 in the front corner of the subframe 50. The second end 87 of the cable 88 is secured to the extended member 84 of the carrier 80. The torsional spring reel 65 maintains a substantially constant tension on the cable 88 while allowing extension of the cable 88 when the carrier 80 is transported along the shaft 75.

A transport assembly 90 moves the carrier 80 on the shaft 75 between the first side 52 and the second side 54 of the opening-closing assembly 22. Referring to FIGS. 3 and 4, the transport assembly 90 comprises a motor assembly 92 having a motor shaft 93, a first pulley 94, a second pulley 95 and a belt 96. The motor assembly 92 is mounted on an extended portion of the third side 56 of the subframe 50 which extends past the second side 54 of the subframe 50 so that the motor shaft 93 passes through the extended portion. A motion encoder 97 is coupled to the motor assembly 92. See FIG. 4. The encoder 97 enables the microprocessor 15 to locate the carrier 80 at various positions on the shaft 75 during a film separation sequence as will be explained. The first pulley 94 is mounted to the motor shaft 93. The second pulley 95 is mounted to a second extended portion on the third side 56 of the subframe 50. The belt 96 is positioned around the first 94 and second 95 pulleys. The carrier 80 is coupled to the belt 96, such as by screws 98 as shown in FIG. 5. The carrier 80 moves on the shaft 75 as the belt 96 travels about the first pulley 94 and the second pulley 95 when the motor assembly 92 is energized. A spring 99 is mounted within the belt 96 to facilitate the use of fixed pulley centers and reduce the shock on the direct drive motor assembly 92 when energized to transport the carrier 80.

Figure 7A:
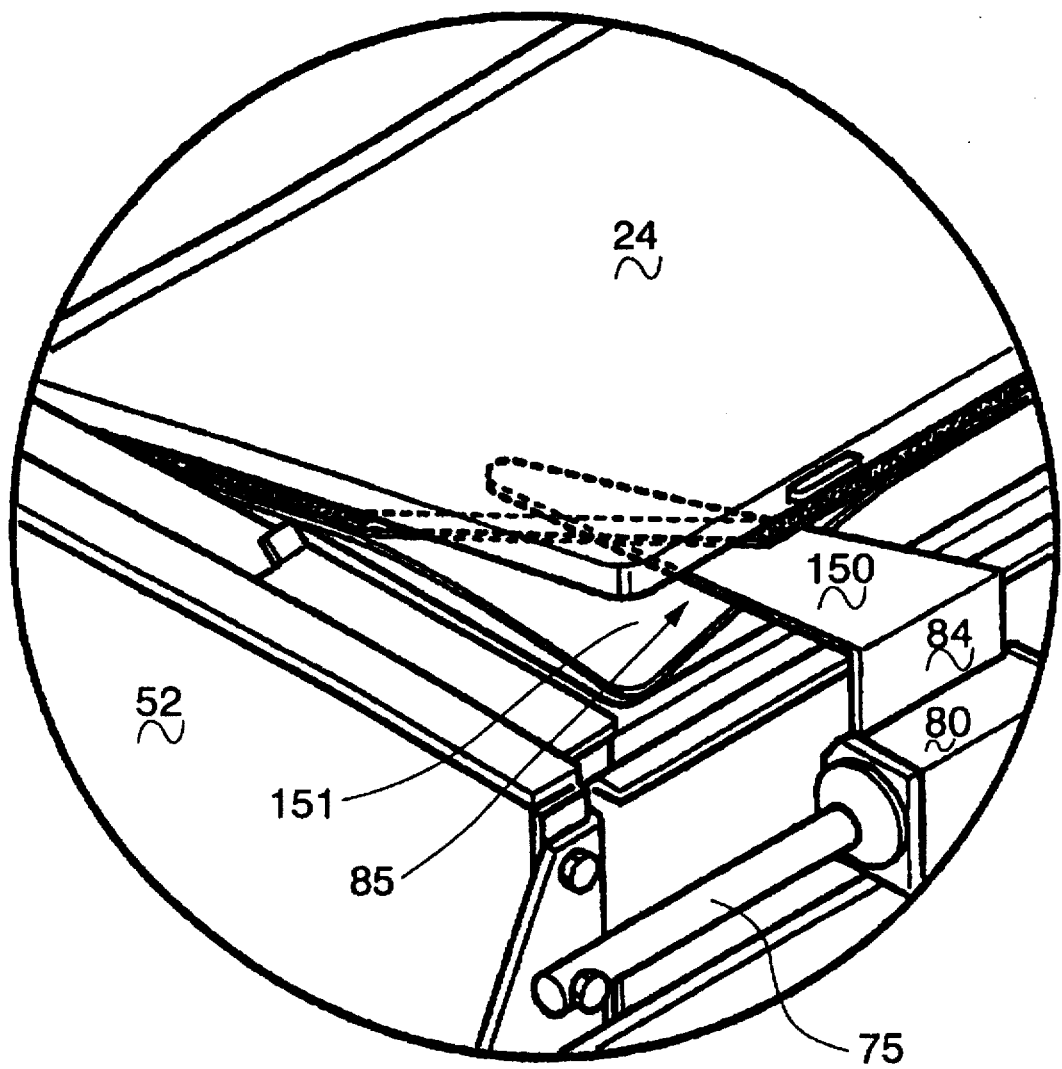
FIG. 7a is an exploded perspective view of the sheet separation apparatus showing an alternate embodiment of a peeling element wherein the peeling element is shaped as a knife-like blade, in place in a partially opened cassette which has a film attracted to an intensifying screen on a door of the cassette.
Figure 7B:
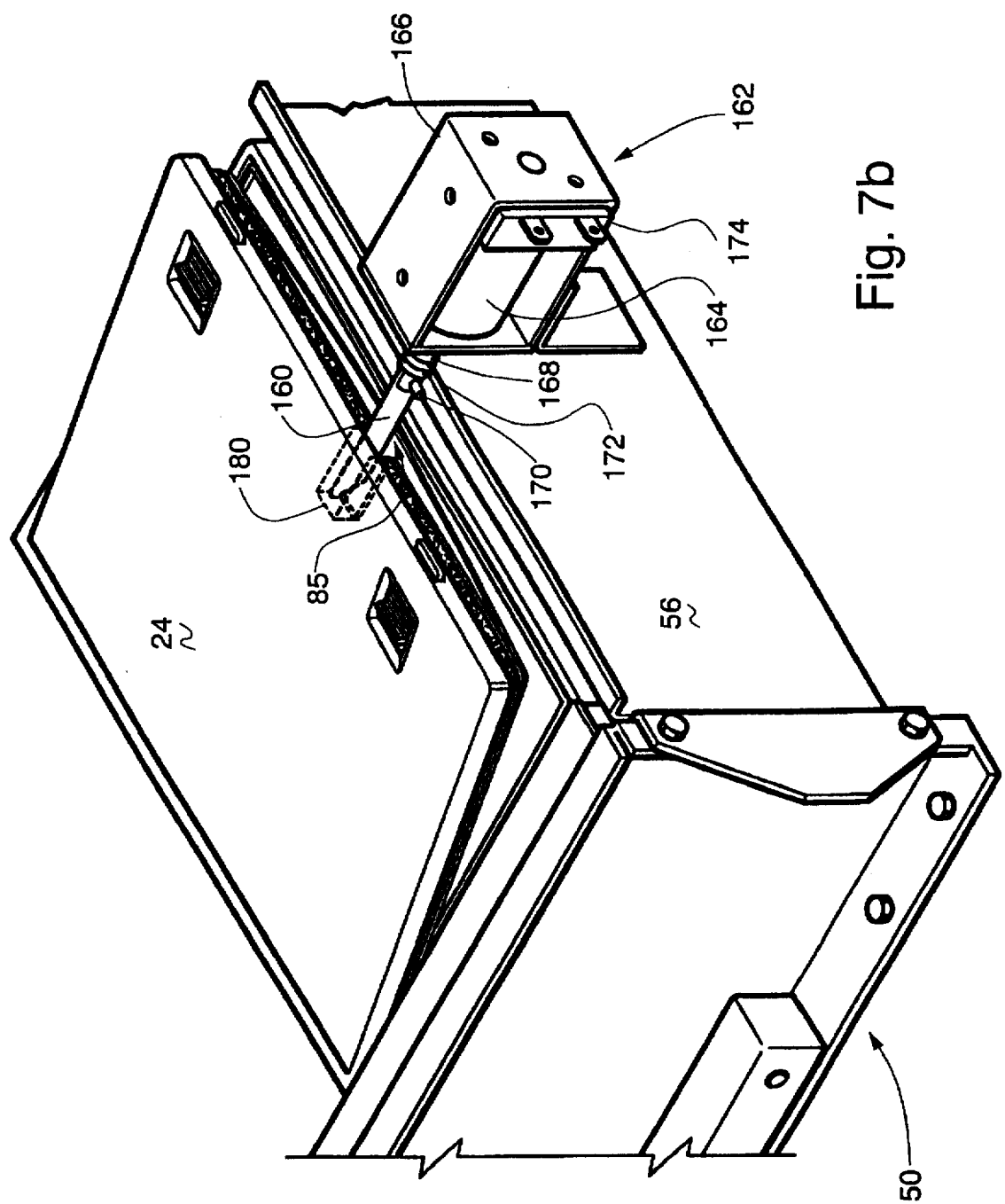
FIG. 7b is a perspective view of the sheet separation apparatus showing another alternate embodiment of a peeling element wherein the peeling element is shaped as a retractable pin.

Alternate embodiments of the peeling element 85 are shown in FIGS. 7a and 7b. FIG. 7a shows a second embodiment of the peeling element 85 shaped as a knife-like blade 150 which projects from the integral member 84 of the carrier 80 toward the cassette 24. The blade 150 can be integral to (i.e., one piece with) member 84 or mounted to the member 84 in any suitable manner. The blade 150 is interspersed above a cantilevered film portion 151 in the partially opened cassette 24. The blade 150 acts in substantially the same manner as the peeling element 85 shaped like a cable, to separate the film from a surface in the cassette 24.

FIG. 7b shows a third embodiment of the peeling element 85 shaped as a retractable pin 160. In this embodiment, the retractable pin 160 is coupled to a pin assembly 162. The pin assembly 162 is mounted to the third side 56 of the subframe 50 of the cassette opening and closing assembly 22. The pin assembly 162 includes a solenoid 164 mounted in a housing 166. The housing 166 has an opening (not shown) which allows for an end of a core member 168 of the solenoid 164 to extend out of the housing 166 and retract in the housing 166 and into the solenoid 164. The retractable pin 160 is coupled to the end of the core member 168. A retainer pin 170 is mounted on the retractable pin 160 near the end which couples to the core member 168. A coil spring 172 is located on the retractable pin 160 between the retainer pin 170 and the housing 166. The solenoid 164 has a plug 174 which connects to a power source (not shown). When the solenoid 164 is energized, the retractable pin 160 is retracted in the housing 166 away from the cassette 24 and the coil spring 172 is compressed. When the solenoid 164 is not energized, the coil spring 172 relaxes as the retractable pin 160 extends away from the housing 166 and is interspersed above the film into a cutout portion 180 in the cover screen and screen support in a partially opened cassette 24. The retractable pin 160 and the pin assembly 162 are positioned between the first side 52 and the second side 54 of the opening and closing assembly 22 so that the retractable pin 160 will be at a fixed distance from the front corner of the cassette 24 to suitably separate a film from a cassette surface for all sizes of cassettes used in the film handling apparatus.

Figure 8A:
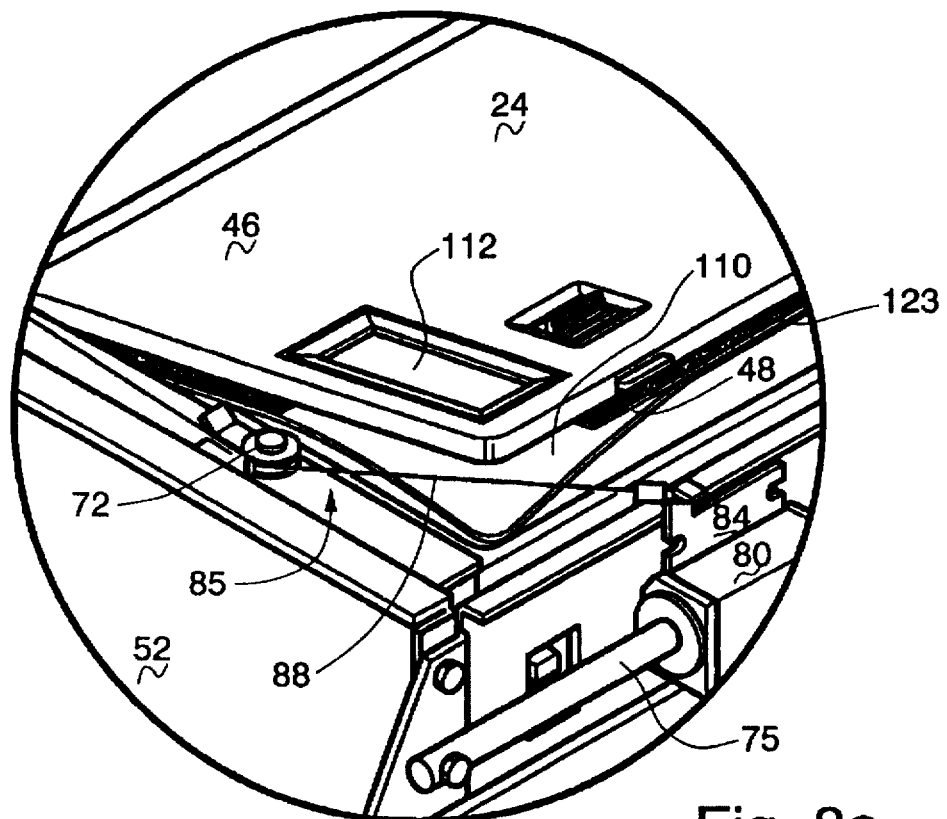
FIG. 8a is an exploded perspective view of the sheet separation apparatus with a cassette having a window cutout.
Figure 8B:
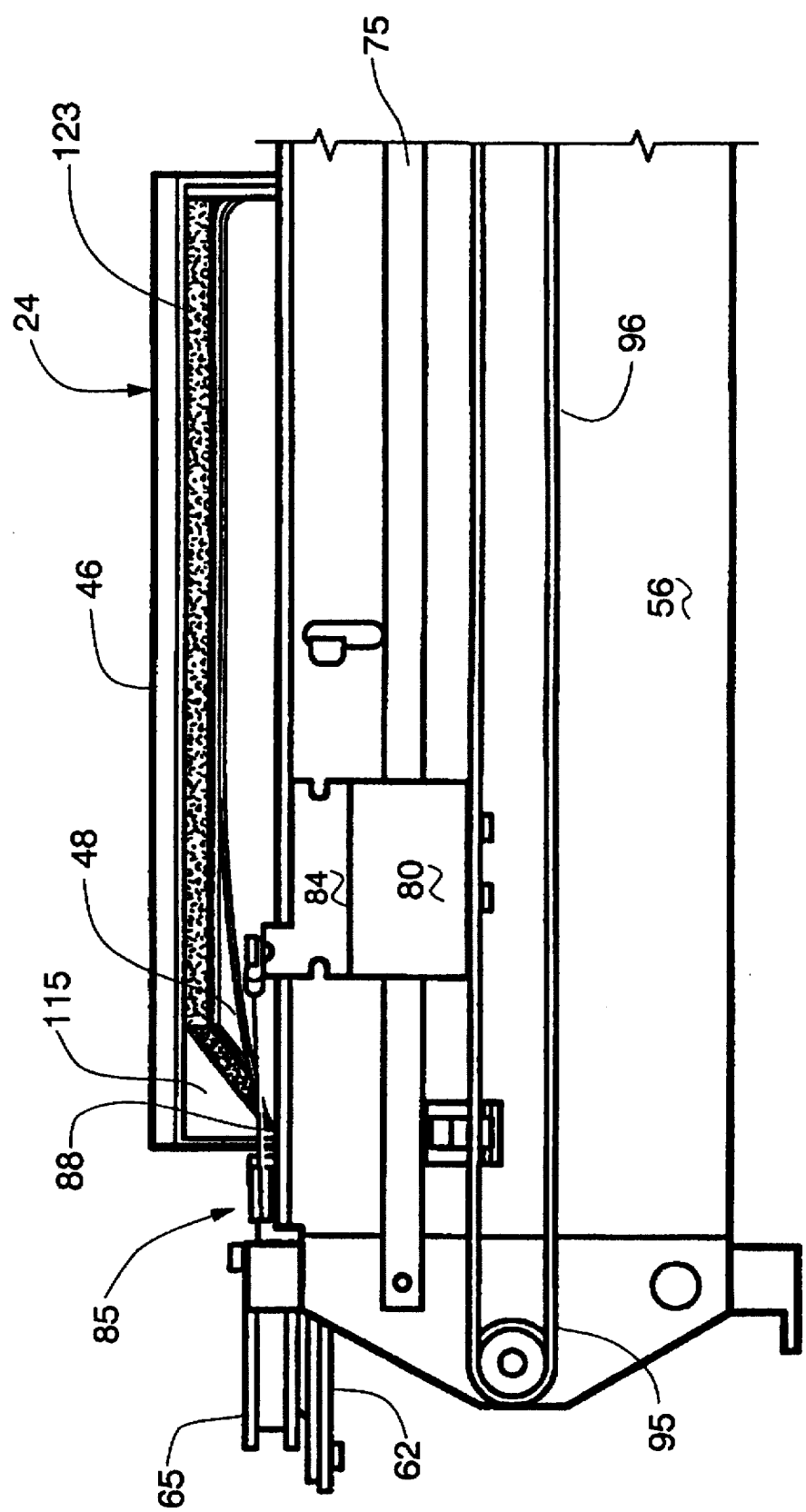
FIG. 8b is an exploded front view of the sheet separation apparatus with a cassette having a window-like cutout area.

To facilitate the reliable positioning of the peeling element 85 between the film sheet and the cover intensifying screen 48 (see FIG. 5), it is preferred that means be employed for initially separating the film from the surface of the screen 48 positioned in the corner of the cassette 24 in the front corner of the subframe 50. In one embodiment shown in detail in FIG. 8a, the film naturally cantilevers out from the screen 48 when the cassette 24 is opened in a window cassette. FIG. 8a shows a window area 112 in a window cassette. A window cassette has a cutout area or space 110 in the cover screen 48 and screen support 123 (i.e., foam) at the front corner (generally referred to in the radiology industry as blocker position 8). The peeling element 85 enters the cassette 24 when the cassette 24 is opened to a minimum height and is positioned above the cantilevered film in the cutout area 110. The cassette 24 opens slightly further and the peeling element 85 is fully positioned between the film and screen before the cassette cover 46 is fully opened. As shown in FIG. 8b, a non-window cassette can have cutouts 115 in a cover screen 48 and foam support 123 creating a space or window-like cutout area 115 to simulate the window cassette to affect the same results, i.e., a cassette with a window-like cutout.

Figure 9:
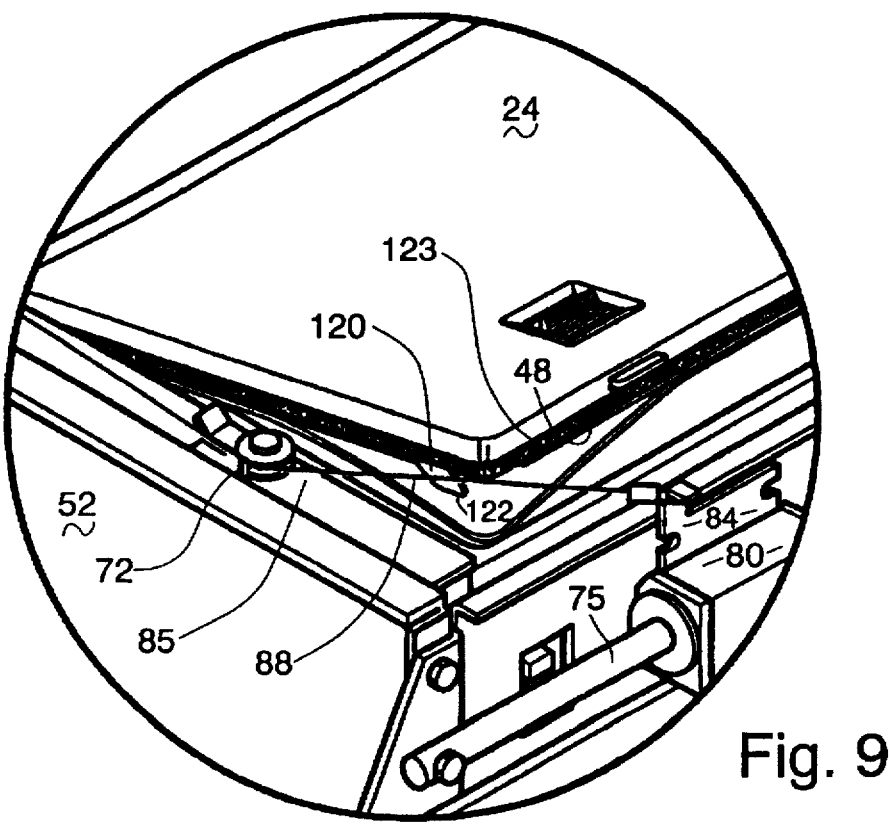
FIG. 9 is an exploded perspective view of the sheet separation apparatus with a cassette which has a spring member for initiating the separation of the sheet.
Figure 10:
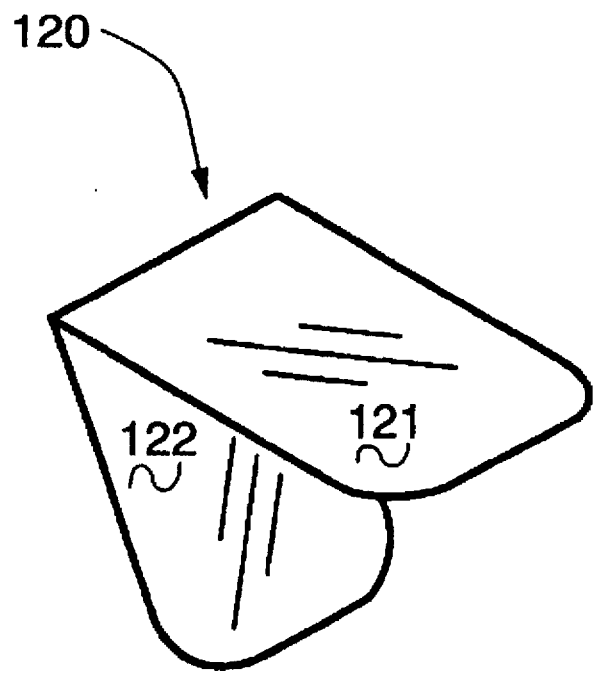
FIG. 10 is a perspective view of a cantilever spring suitable for use in a cassette to initiate the separation of a sheet contained in the cassette.

In an alternate embodiment shown in detail in FIGS. 9 and 10, a small cantilever polyester spring 120, is located at the front corner of the cassette 24 (in the front corner of the subframe 50) on the cover intensifying screen 48. The spring 120 has a first member 121 and a second member 122. The first member 121 of the cantilevered spring 120 is secured between the screen 48 and a screen support member 123, i.e., a foam support, in the cassette 24 so that the second member 122 of the cantilever spring 120 is positioned between the film and the cover screen 48 when a film is in the cassette 24. Upon opening the cassette 24, the second member 122 of the spring 120 extends away from the cover screen 48 locally deflecting the film from the cover screen 48 at the front corner of the cassette 24 and creating an initial site for placement of the peeling element 85 (illustrated, for instance, in FIGS. 3 and 7a) between the film sheet and the cover intensifying screen 48. Preferably, the peeling element 85 does not come in contact with the cover intensifying screen 48.

Figure 11:
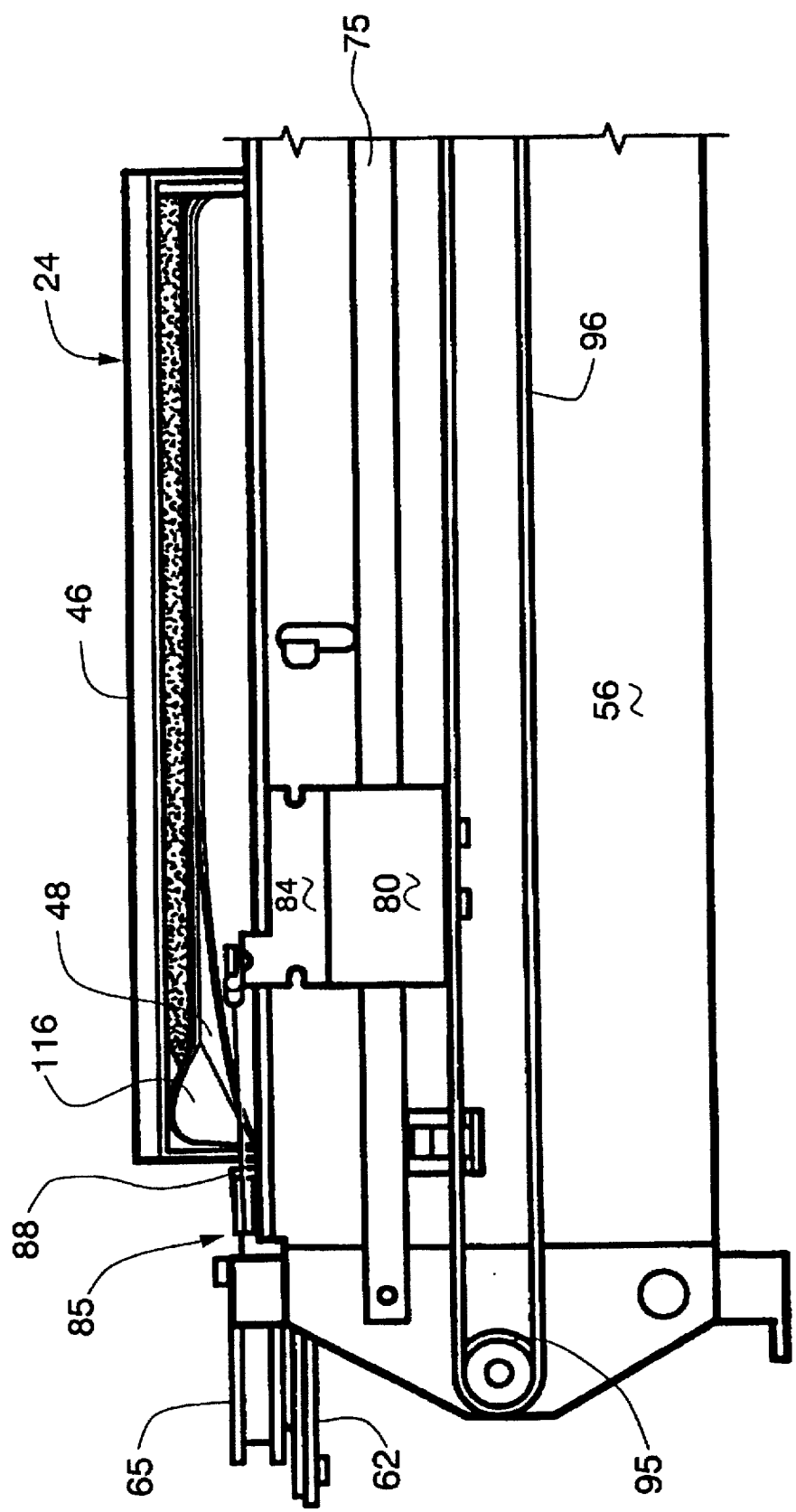
FIG. 11 is a front view of the sheet separation apparatus with a cassette which has a portion of an intensifying screen locally deflected toward the cassette cover.

Alternately, as shown in FIG. 11, it is possible to have the surface of the screen 48 locally deflected toward the cassette cover away from the film to provide a relief or indentation 116 for the initial proper placement of the peeling element 85. However, in this case, the peeling element 85 may contact or come in very close proximity to the cover intensifying screen 48. It is undesirable to contact the peeling element 85 on the intensifying screen 48 because this may abrade or otherwise mar or scratch the intensifying screen 48 and shorten the useable life of the screen 48.

Figure 12A:
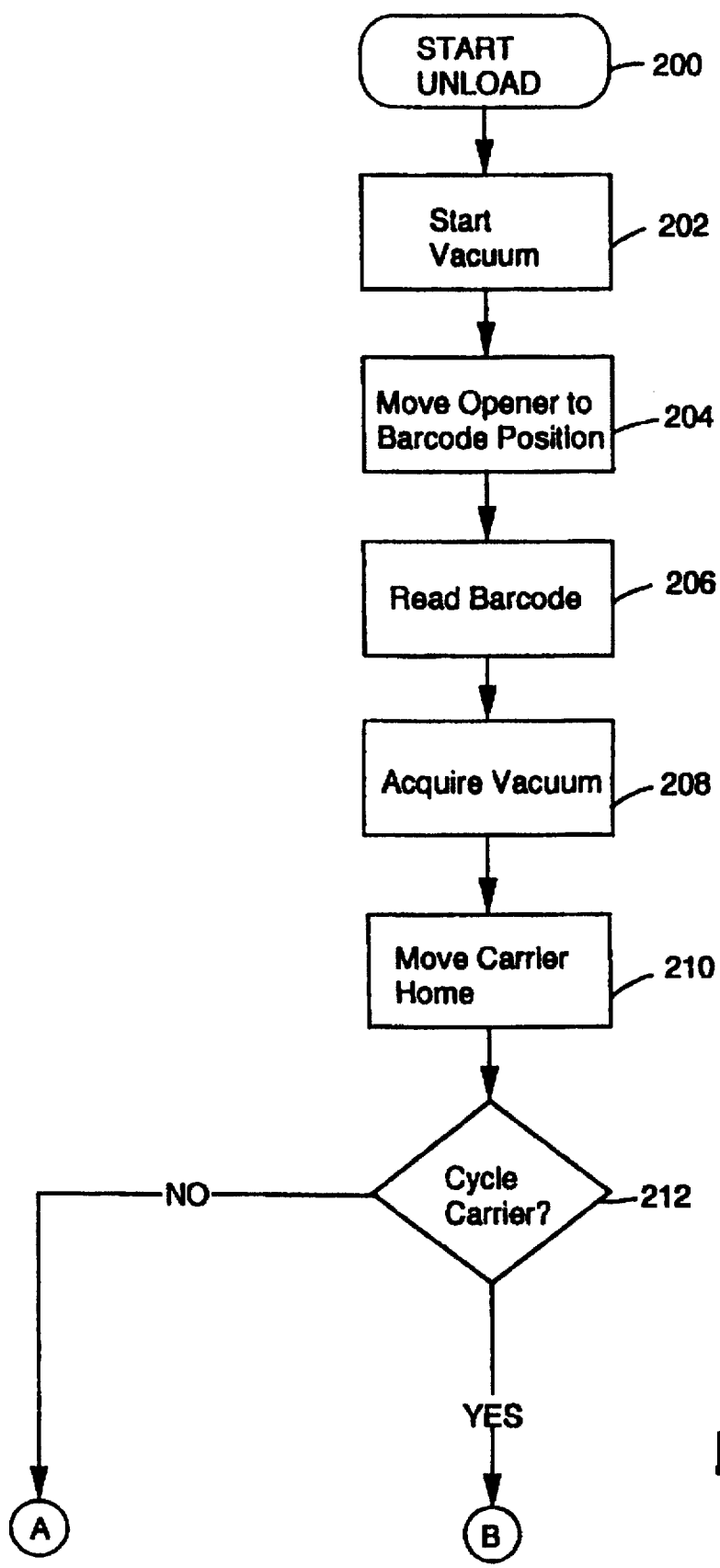
FIG. 12a is a flowchart of a film unloading sequence separating a sheet from an intensifying screen in a cassette in an automatic film handling apparatus in accordance with the apparatus of this invention.
Figure 12B:
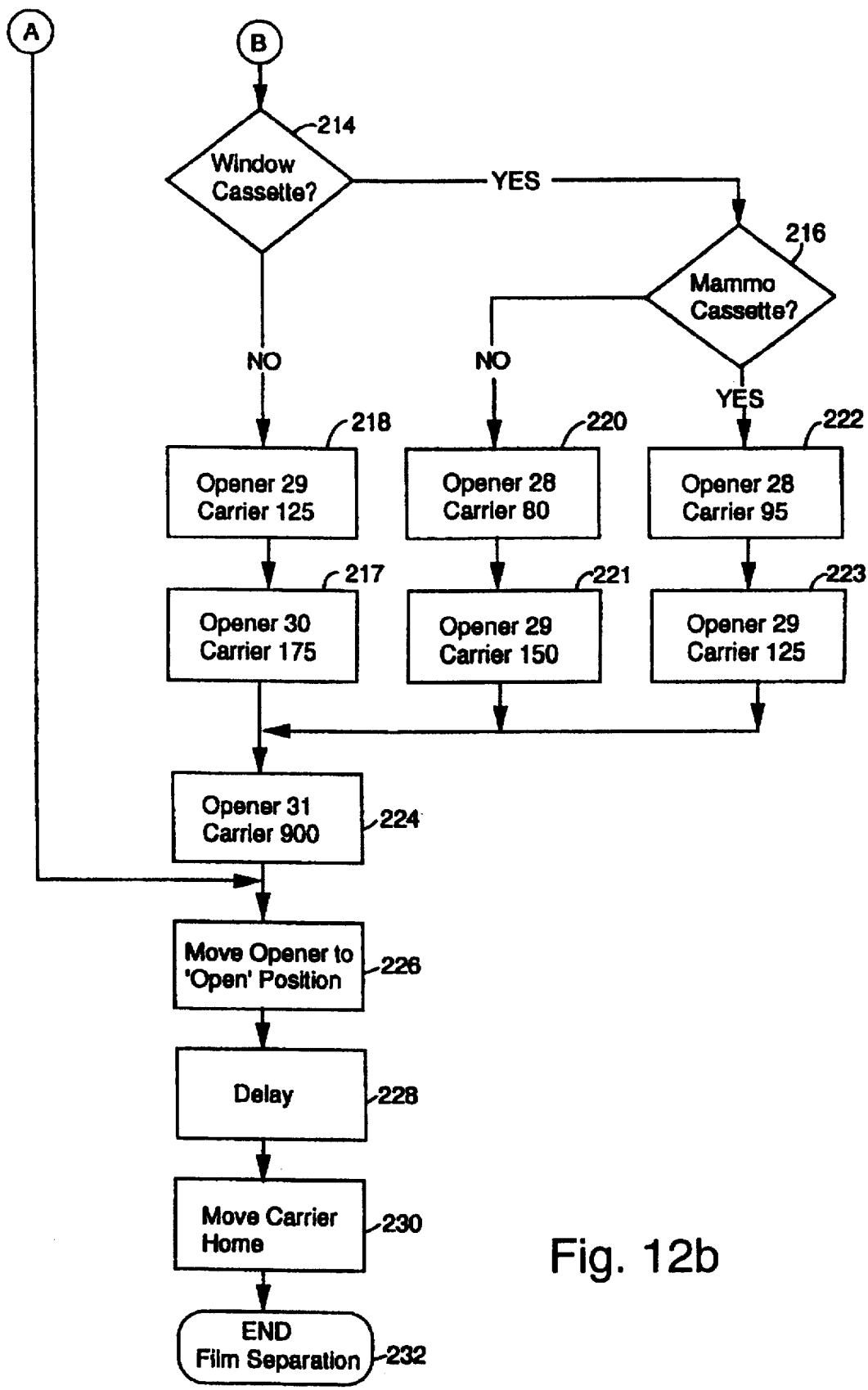
FIG. 12b is a continuation of the flowchart of the film unloading sequence separating the film sheet from an intensifying screen in a cassette in accordance with the apparatus of this invention.

Referring to FIGS. 12a and 12b, the film separation apparatus 25 of this invention operates as follows for a film unloading sequence from a cassette 24 in an automatic daylight film handling apparatus 10. The operation of the film separation apparatus 25 will be described relative to the preferred peeling element 85 shaped as a cable 88. The cassette 24 to be unloaded is located by the opening-closing assembly 22 at the front corner of the assembly 22. The upper portion 49 of the assembly 22 is partially raised with respect to the front portion 44. A signal generated by a sensor (not depicted) is sent to the microprocessor 15 that the cassette 24 is ready to be unloaded as indicated at 200. The film unload sequence begins by starting a vacuum as indicated at 202 associated with vacuum elements 21 in the upper portion 49 of the cassette opening-closing assembly 22. The upper portion 49 of the cassette opening-closing assembly 22 referred to as the opener in block 204 is lowered so that an optical sensor assembly 19 in the upper portion 49 is positioned above a barcode on the outside of the cassette cover 46. As indicated at 206, the barcode on the cassette 24 is read providing information on the type and size of the cassette and other information to the host computer associated with the daylight handling apparatus 10. The vacuum elements 21 in the upper portion 49 of the cassette opening-closing assembly 22 contact and acquire a vacuum on the cassette cover 46 (see 208). As indicated at 210, the carrier 80 of the film separation apparatus 25 of this invention is positioned at a home position located at or near the first end 76 of the shaft 75. From the information sent to the host computer or from a manual override by a technician, it is determined (see 212) whether the film separation apparatus 25 needs to be operated, i.e., transporting the carrier 80 on the shaft 75 by the transport assembly 90 so that the peeling element 85 separates film from cover screen 48. Since the daylight film handling apparatus 10 can handle a plurality of types and sizes of films and cassettes it may not be necessary for the film separation apparatus 25 to operate for specific types of films and/or cassettes. For example, the film separation apparatus 25 may not need to operate when unloading cassettes which do not have a cover screen, or when a film has a natural tendency to curl away from the cover surface or cover screen 48. In these cases, the film unload sequence skips the operation of the film separation apparatus 25 (see line A from block 212) and proceeds with the opening of the cassette 24 at block 226 in FIG. 12b.

If the cassette and/or the film being unloaded do require the operation of the film separation apparatus 25 (see line B from block 212), the initial and subsequent positions of the carrier 80 on the shaft 75 and the height of the opening of the upper portion 49 of the opening-closing assembly 22 are determined by the particular geometry of the cassette, i.e., the type of cassette 24, being unloaded. Specifically, the carrier 80 is positioned on the shaft 75 controlled by the encoder 97 associated with the transport assembly 90 for the initial and subsequent separation positions which are between the home position and near the second end 78 of the shaft 75. The upper portion 49 of the opening-closing assembly 22 is raised to an initial and subsequent separation positions by a motor assembly 13 with position information provided by an encoder 17 associated with the opening-closing assembly 22 (see FIG. 2). The film separation apparatus 25 operates to appropriately position the carrier 80 on the shaft 75 and the motor assembly 13 raises the upper portion 49 of the opening-closing assembly 22 according to the type of cassette being opened in the following film separation sequence: (a) the upper portion 49 of the opening-closing assembly 22 is raised to an initial or minimum height; (b) the carrier 80 is moved to an initial position on the shaft 75 so that the peeling element 85 is appropriately located at or near the film edge with the cassette 24 in the front corner of the subframe 50; (c) the upper portion 49 is slightly raised to a second height; and (d) the carrier 80 is moved to a second position on the shaft 75 closer to the second end 78, assuring that the peeling element 85 is reliably positioned between the film and cover screen 48. Further, (e) the upper portion 49 is raised to a third height and (f) the carrier 80 is moved to a third position on the shaft 75 located at or near the second end 78 of the shaft 75, extending the peeling element 85 across the entire film width and interspersing the peeling element 85 between the film and cover screen 48. It should be understood that raising of the upper portion 49 and moving the carrier 80 can occur simultaneously, i.e., steps (a) and (b) can occur at the same time. Similarly, steps (c) and (d) can occur at the same time. Similarly, steps (e) and (f) can occur at the same time.

FIG. 12b includes blocks illustrating steps (a) through (f) under various conditions. Referring to block 214, if the cassette 24 being unloaded does not have a window cutout or a window-like cutout and thus, for instance, uses the cantilevered spring 120 as described in FIGS. 9 and 10 to initiate film screen separation, then steps (a) and (b) are performed illustrated by block 218. Specifically, in step (a) the upper portion 49 of the opening-closing assembly 22 is raised to the initial or minimum height indicated by opener encoder 17 position 29 and in step (b) the carrier 80 is moved to an initial position on the shaft 75 associated with encoder 97 position 125 so that the peeling element 85 is appropriately located at or near the film edge with the cassette 24 in the front corner of the subframe 50.

If the cassette 24 being unloaded does have a window 110, typically there are two sizes of window which need to be considered (see block 216) relative to the film separation apparatus 25. A typical standard size of window in a cassette is approximately 1 inch wide by 3 inches long. Block 220 illustrates steps (a) and (b) for such a cassette. In step (a), the upper portion 49 of the opening-closing assembly 22 is raised to the initial or minimum height indicated by opener encoder position 28 and in step (b) the carrier 80 is positioned on the shaft 75 to the appropriate encoder position (i.e., 80) to appropriately position the peeling element 85 at or near the naturally cantilevered film in the window cutout space 110. A mammography cassette has a narrower window than the standard size window. Block 222 illustrates steps (a) and (b) for such a cassette. In step (a), the upper portion 49 of the opening-closing assembly 22 is raised to a position associated with opener encoder 17 position 28. In step (b), the carrier 80 is positioned on the shaft 75 to the encoder 97 position 95 to appropriately position the peeling element 85 at or near the naturally cantilevered film in the narrower window cutout area 110. Cassettes which have the screen and foam support cutout area 115 to simulate the window cassettes, i.e., window-like cutout area, follow the opener and carrier encoder positions described by block 222. It should be understood that the numbers associated with the upper portion 49 and the carrier 80 as indicated in blocks 218, 220 and 222 represent preferred encoder positions associated with the opening-closing assembly 22 and the transport assembly 90 and that the larger the number, the higher the height of the upper portion 49 and the further away from home position of the carrier 80 on the shaft 75.

In each case, steps (c) and (d) are then performed after steps (a) and (b) at the associated encoder positions indicated in blocks 219, 221 and 223. Then steps (e) and (f) are performed as indicated at block 224. The upper portion 49 of the opening-closing assembly 22 is raised to a third height (associated with opener encoder position 31) and the carrier 80 is transported by the transport assembly 90 to a third position on the shaft 75 (associated with carrier encoder position 900) located at or near the second end 78 of the shaft 75.

Then as the upper portion 49 of the opening-closing assembly 22 is raised to the full open position (see 226), the cover 46 of the cassette 24 is raised and the peeling element 85 prevents the film from following the cover screen 48 and peels the film from the cover screen 48. A delay occurs (see 228) to allow time for the film to settle in the cassette 24. The carrier 80 is returned to the home position (see 230), and the film separation sequence ends (see 232). Then the film unload sequence continues as described previously in the operation of the daylight film handling apparatus 10.

Although the separating apparatus 25 has been described in relation to peeling film from the cover intensifying screen 48, the separating apparatus 25 could easily be used to separate any film from any flat surface including an X-ray film from the front screen 47.

Those skilled in the art, having the benefit of the teachings of the present invention as hereinabove set forth, can effect numerous modifications thereto. Those modifications are to be construed as being encompassed within the scope of the present invention as set forth in the appended claims.

What is claimed is:

1. An apparatus for separating a X-ray film sheet from a surface in an X-ray cassette with a top portion and a bottom portion in an automatic X-ray cassette handling assembly, the apparatus comprising:
   a peeling element for insertion between the X-ray film sheet and the surface and for peeling the X-ray film sheet from the surface; and
   first means for inserting the peeling element between the X-ray film sheet and the surface when the sheet is adherred to the surface mainly by electrostatic and vacuum forces and for moving the peeling element with respect to the surface without cutting any portion of the film or surface and without the first means contacting the sheet.

2. The apparatus of claim 1, wherein:
   the peeling element is shaped as a knife-like blade having an insertion end and a securing end; and
   the first means comprises:
      a carrier connected to the blade securing end, the carrier having a passage;
      a shaft parallel to the front edge, the shaft extending through the passage and supporting the carrier; and
      eighth means for moving the carrier along the shaft.

3. The apparatus of claim 1, wherein:
   the peeling element comprises a pin; and
   the first means comprises:
      ninth means for actuating the pin between a first position and a second position, the first position retracted from a front edge of the surface and the second position extending the pin between the sheet and either the top portion or the bottom portion; and
      tenth means for opening the cassette such that the extended pin peels the sheet from the surface while the tenth means opens the cassette.

4. The apparatus of claim 1, wherein the surface is a bottom planar surface such that the film is peeled down from the surface by the peeling element.

5. An apparatus for separating a X-ray sheet from a surface in an X-ray cassette with a top portion and a bottom portion in an automatic X-ray cassette handling assembly, the apparatus comprising:
   a peeling element for insertion between the X-ray film sheet and the surface and for peeling the X-ray film sheet from the surface wherein the peeling element is shaped as an elongated member having a first end, a middle portion and a second end; and
   first means for inserting the peeling element between the X-ray film sheet and the surface when the sheet is adherred to the surface mainly by electrostatic and vacuum forces and for moving the peeling element with respect to the surface without cutting any portion of the film or surface wherein the peeling element is inclined with respect to the sheet while peeling the sheet from the surface, and the first means comprises:
      second means for securing the first end near a side edge of the surface and for maintaining a substantially constant tension in the peeling element while allowing extension of the peeling element; and
      third means for transporting the second end across a front edge of the cassette,
   such that when the cassette is open and the third means starts from a home position and transports the peeling element second end across the front edge of the cassette the middle portion inserts between the sheet and the surface and slides against the sheet separating the sheet from the surface.

6. The apparatus of claim 5, wherein the second means comprises:
   a reel assembly for maintaining the substantially constant tension in the peeling element while allowing extension of the peeling element.

7. The apparatus of claim 5, wherein the second means comprises:
   at least one guide for securing the first end near the side edge of the surface when the cassette is in a front corner of the automatic cassette handling assembly.

8. An apparatus for separating an X-ray film sheet from a surface in an X-ray cassette with a top portion and a bottom portion in an automatic X-ray cassette handling assembly, the apparatus comprising:

a peeling element for insertion between the X-ray film sheet and the surface and for peeling the X-ray film sheet from the surface, the peeling element shaped as an elongated member having a first end, a middle portion and a second end; and first means for inserting the peeling element between the X-ray film sheet and the surface and for moving the peeling element with respect to the surface wherein the peeling element is inclined with respect to the surface while peeling the sheet from the surface, the first means comprising:

second means for securing the first end near a side edge of the surface and for maintaining a substantially constant tension in the peeling element while allowing extension of the peeling element;

third means for transporting the second end across a front edge of the cassette;

fourth means for opening the cassette; and fifth means for controlling the third means and the fourth means such that the second end of the peeling element is transported across the front edge of the cassette while the cassette is opening, such that when the cassette is open and the third means starts from a home position and transports the peeling element second end across the front edge of the cassette the middle portion inserts between the sheet and the surface and slides against the sheet separating the sheet from the surface.

9. An apparatus for separating a sheet from a surface in an X-ray cassette with a top portion and a bottom portion in an automatic X-ray cassette handling assembly, the apparatus comprising:

a peeling element for insertion between the sheet and the surface and for peeling the sheet from the surface, wherein the peeling element is shaped as an elongated member having a first end, a middle portion and a second end: and first means for inserting the peeling element between the sheet and the surface and for moving the peeling element with respect to the surface separating the sheet from the surface, the first means comprising:

second means for securing the first end near a side edge of the surface and for maintaining a substantially constant tension in the peeling element while allowing extension of the peeling element; and third means for transporting the second end across a front edge of the cassette, wherein the third means comprises:

a carrier connected to the second peeling element end, the carrier having a passage;

a shaft parallel to the front edge when the cassette is in a front corner of the automatic cassette handling assembly, the shaft extending through the passage and supporting the carrier; and sixth means for moving the carrier along the shaft, such that when the cassette is open and the third means starts from a home position and transports the peeling element second end across the front edge of the cassette the middle portion inserts between the sheet and the surface and slides against the sheet separating the sheet from the surface.

10. An apparatus for separating a sheet from a surface in an X-ray cassette with a top portion and a bottom portion in an automatic X-ray cassette handling assembly, the apparatus comprising:

a peeling element for insertion between the sheet and the surface and for peeling the sheet from the surface, wherein the peeling element is shaped as an elongated member having a first end, a middle portion and a second end; and first means for inserting the peeling element between the sheet and the surface and for moving the peeling element with respect to the surface separating the sheet from the surface, the first means comprising:

second means for securing the first end near a side edge of the surface and for maintaining a substantially constant tension in the peeling element while allowing extension of the peeling element; and third means for transporting the second end across a front edge of the cassette, wherein the third means comprises:

a carrier connected to the second peeling element end, the carrier having a passage;

a shaft parallel to the front edge when the cassette is in a front corner of the automatic cassette handling assembly, the shaft extending through the passage and supporting the carrier; and sixth means for moving the carrier along the shaft, wherein the sixth means further comprises:

a motor assembly having a motor shaft;

a first pulley on the motor shaft;

a second pulley; and a belt positioned around the first pulley and the second pulley, the carrier connected to the belt, such that when the cassette is open and the third means starts from a home position and transports the peeling element second end across the front edge of the cassette the middle portion inserts between the sheet and the surface and slides against the sheet separating the sheet from the surface.

11. An assembly, comprising:

an X-ray cassette with a top portion with an intensifying screen with a surface and a bottom portion;

a peeling element for insertion between an X-ray film sheet from the surface when the sheet is adherred to the surface mainly by electrostatic and vacuum forces and for peeling the sheet from the surface; and first means for inserting the peeling element between the sheet and the surface and for moving the peeling element with respect to the surface separating the sheet from the surface without cutting any portion of the sheet or surface.

12. The assembly of claim 11, further comprising:

seventh means for initiating separation of a front corner of the sheet from a front corner of the surface.

13. The assembly of claim 11, wherein the surface is a lowest planar surface of the intensifying screen such that the film is peeled down from the surface by the peeling element.

14. An assembly, comprising:

an X-ray cassette with a top portion with an intensifying screen with a surface and a bottom portion;

a peeling element for insertion between an X-ray film sheet from the surface when the sheet is adherred to the surface mainly by electrostatic and vacuum forces and for peeling the sheet from the surface;

first means for inserting the peeling element between the sheet and the surface and for moving the peeling element with respect to the surface separating the sheet from the surface without cutting any portion of the sheet or surface; and seventh means for initiating separation of a front corner of the sheet from a front corner of the surface, wherein the seventh means comprises:

a spring member mounted on the front corner of the surface.

15. An assembly comprising:

an X-ray cassette with a top portion with an intensifying screen with a surface and a bottom portion;

a peeling element for insertion between an X-ray film sheet from the surface when the sheet is adherred to the surface mainly by electrostatic and vacuum forces and for peeling the sheet from the surface;

first means for inserting the peeling element between the sheet and the surface and for moving the peeling element with respect to the surface separating the sheet from the surface without cutting any portion the sheet or surface; and seventh means for initiating separation of a front corner of the sheet from a front corner of the surface, wherein the seventh means comprises:

a relief area in the front corner of the surface.

16. An assembly comprising:

an X-ray cassette with a top portion with an intensifying screen with a surface and a bottom portion;

a peeling element for insertion between an X-ray film sheet from the surface when the sheet is adherred to the surface mainly by electrostatic and vacuum forces and for peeling the sheet from the surface;

first means for inserting the peeling element between the sheet and the surface and for moving the peeling element with respect to the surface separating the sheet from the surface without cutting any portion of the sheet or surface; and seventh means for initiating separation of a front corner of the sheet from a front corner of the surface, wherein the seventh means comprises:

a cutout area in the front corner of the surface.

* * * * *